US008967693B2

(12) United States Patent
Young et al.

(10) Patent No.: US 8,967,693 B2
(45) Date of Patent: Mar. 3, 2015

(54) MATERIALS SCOOP

(71) Applicants: Michael Young, Mukwonago, WI (US); Cynthia Rosenthal, Williams Bay, WI (US)

(72) Inventors: Michael Young, Mukwonago, WI (US); Cynthia Rosenthal, Williams Bay, WI (US)

(73) Assignee: San Jamar, Inc., Elkhorn, WI (US)

( * ) Notice: Subject to any disclaimer, the term of this patent is extended or adjusted under 35 U.S.C. 154(b) by 8 days.

(21) Appl. No.: 13/828,693

(22) Filed: Mar. 14, 2013

(65) Prior Publication Data

US 2014/0265399 A1 Sep. 18, 2014

(51) Int. Cl.
*A47F 13/08* (2006.01)
*A47J 43/28* (2006.01)

(52) U.S. Cl.
CPC . *A47F 13/08* (2013.01); *A47J 43/28* (2013.01)
USPC .............................. 294/176; 294/179; 294/131

(58) Field of Classification Search
CPC .. A01K 23/005; A01K 1/0114; E01H 1/1206; E01H 1/12; A47J 43/22; G01F 19/002
USPC ............ 294/179, 176, 1.3, 1.4, 1.5, 180, 131; 119/166; 209/418
See application file for complete search history.

(56) References Cited

U.S. PATENT DOCUMENTS

| 97,025 | A | * | 11/1869 | Beucus | 209/418 |
| 1,711,566 | A | * | 5/1929 | Jacobs | 294/180 |
| 2,670,557 | A | * | 3/1954 | Pachner | 43/4 |
| 3,747,253 | A | * | 7/1973 | Gangi et al. | 43/4 |
| 3,840,261 | A | * | 10/1974 | Fulkerson et al. | 294/176 |
| 5,190,326 | A | * | 3/1993 | Nunn | 294/1.3 |
| 6,612,379 | B1 | * | 9/2003 | Timmons | 172/375 |
| D496,233 | S | * | 9/2004 | Young et al. | D7/691 |
| 7,621,572 | B2 | * | 11/2009 | Omdoll et al. | 294/176 |
| 7,942,460 | B2 | * | 5/2011 | Boskett et al. | 294/1.4 |
| 8,678,198 | B1 | * | 3/2014 | D'Andrea | 209/417 |
| 2010/0326848 | A1 | * | 12/2010 | Mangin et al. | 206/216 |
| 2013/0026773 | A1 | * | 1/2013 | Rockwell et al. | 294/53.5 |

OTHER PUBLICATIONS

OXO Brand Scoop and Bucket Images.

* cited by examiner

*Primary Examiner* — Saul Rodriguez
*Assistant Examiner* — Gabriela Puig
(74) *Attorney, Agent, or Firm* — Boyle Fredrickson, S.C.

(57) ABSTRACT

A sanitary scoop that includes a scoop portion, a handle portion, a shield portion, a partition wall formed between the scoop portion and the handle and shield portions, and a tab. The sanitary scoop is constructed to allow placement of the scoop in various orientations while maintaining sanitation of the scoop portion.

23 Claims, 8 Drawing Sheets

MATERIALS SCOOP

FIELD OF THE INVENTION

The present invention relates generally to devices for moving materials in a scooped manner and, more particularly, to a scoop for picking up and transferring ice or the like from one container to another.

BACKGROUND OF THE INVENTION

Scoops are widely used to transfer materials from one container to another. Typically, a scoop is used to transfer food, ice or other free flowing, granular, or cubed materials from a larger vessel to a smaller vessel, e.g., from a main storage bin or a bucket to smaller storage or dispensing vessels. One such use includes placing a desired quantity of ice cubes in a glass or cup from a larger storage vessel such as an ice bin or bucket. However, most scoops used in this process are not ergonomically designed, present the potential for inadvertent contamination of ice due to undesired contact of the ice or the scoop with adjacent structures and/or the hands of the user, inefficiently transfer the scooped material resulting in spillage, and can be ill-equipped to maximize the volume of material conveyed per scoop.

Another consideration unique to ice scoop constructions is the ability to maximize the transfer of ice while limiting the transfer of liquid water from bulk ice containers to individual glasses or cups. Particularly in banquet type activities, large containers or bins of ice can be placed in the banquet environment such that servers can serve individual guests during a particular event or so that guests can serve themselves. Such bins are frequently uncooled and uninsulated such that a portion of the ice can melt prior to use leaving the remaining ice surrounded by liquid water. Use of conventional solid bodied scoops requires servers to drain the ice with each dispensing activity to prevent the transfer of liquid water with each dispensing event.

As can be seen, current scoops suffer from certain drawbacks and limitations. Accordingly, a need exists for scoops that are ergonomically designed, limit or reduce contamination of the bulk ice as well as the scoop, efficiently transfer the scooped material to minimize spillage and maximize the volume of material conveyed per scoop, facilitate efficient separation of the ice from liquid water associated with the bulk container, and solve other problems associated with the existing designs.

SUMMARY OF THE INVENTION

The present invention discloses a scoop that overcomes one or more of the drawbacks mentioned above. One aspect of the invention discloses a sanitary scoop that includes a scoop portion, a handle portion, a shield portion, and a partition wall formed between the scoop portion and the handle and shield portions. The sanitary scoop is constructed to allow placement of the scoop in various orientations while maintaining sanitation of the scoop portion.

Another aspect of the invention that is usable with one or more of the above aspects discloses a scoop apparatus that includes a body that extends along a longitudinal axis. A wall is formed by the body and extends in a crossing direction relative to the longitudinal axis. A handle portion and a shield portion that are each defined by the body each extend in a first direction away from the wall along the longitudinal axis. The handle portion and the shield portion are spaced from one another to define a finger passage that facilitates gripping of the handle. A scoop portion extends in a second direction opposite the first direction along the longitudinal axis away from the wall. A center of gravity of the body is offset from the wall along the longitudinal axis toward the handle portion and shield portion to maintain a gap between the scoop portion and a horizontal surface when the scoop is placed on a horizontal surface.

Another aspect of the invention that is usable with one or more of the above aspects discloses a scoop apparatus that includes a handle portion that extends in a first direction along a longitudinal axis of the scoop apparatus. A scoop portion extends in a second direction opposite the first direction along the longitudinal axis. A tab extends in the second direction and is radially offset from the scoop portion. The tab defines a first surface that faces the scoop portion and a second surface that is opposite the first surface that is shaped to engage a thumb of a user.

Another aspect of the invention that is usable with one or more of the above aspects discloses a sanitary scoop that includes a scoop portion, a handle portion, and a shield portion that each extend along generally aligned respective longitudinal directions. A partition extends in a crossing direction relative to the respective longitudinal directions. The partition includes a first side that faces the handle portion and the shield portion and a second side that faces the scoop portion. The sanitary scoop includes a tab that extends from the second side of the partition at a location that is generally opposite the scoop portion. The tab is offset in an outward radial direction from an intersection of the handle portion with the partition. The shield portion and the handle portion extend respective distances from the partition such that a center of gravity of the sanitary scoop lies between respective terminal ends of the handle portion and the shield portion such that the scoop can maintain an orientation wherein the sanitary scoop is supported by interaction of the terminal ends of the handle portion and the shield portion with a horizontal surface.

Other aspects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

DESCRIPTION OF THE DRAWINGS

The drawings illustrate the best mode presently contemplated of carrying out the invention.

In the drawings.

DETAILED DESCRIPTION OF THE PREFERRED EMBODIMENTS

Figure 1:
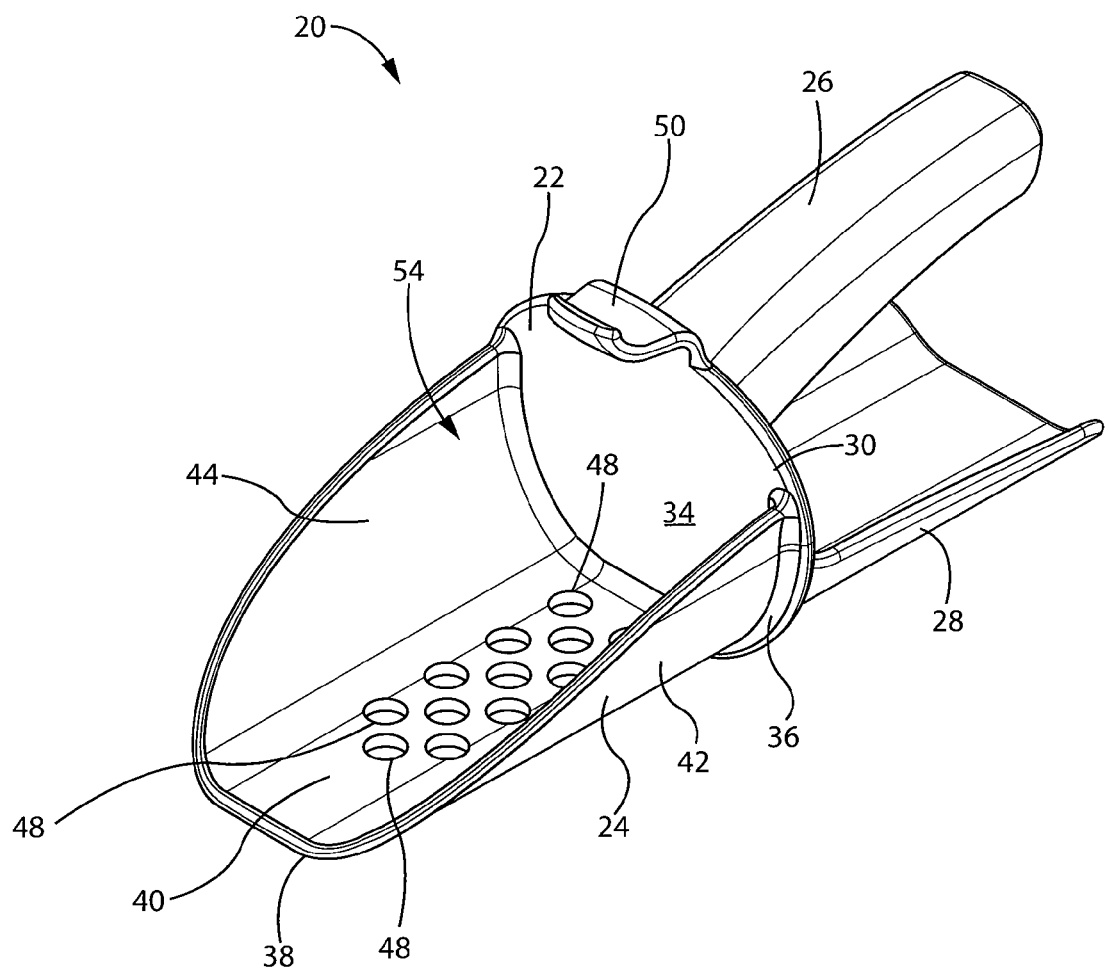
FIG. 1 is a top front perspective view of a scoop according to the present invention.
Figure 2:
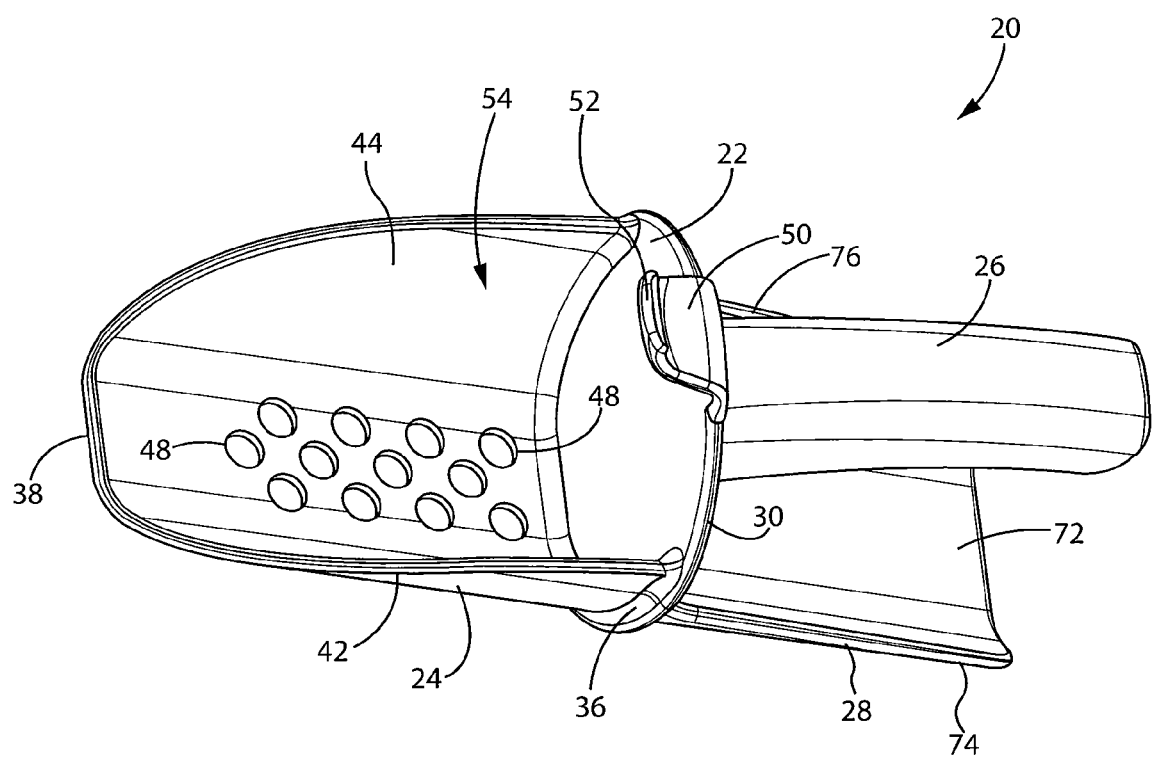
FIG. 2 is a top front perspective view and shows a plurality of holes formed in a scoop portion of the scoop shown in FIG. 1.
Figure 3:
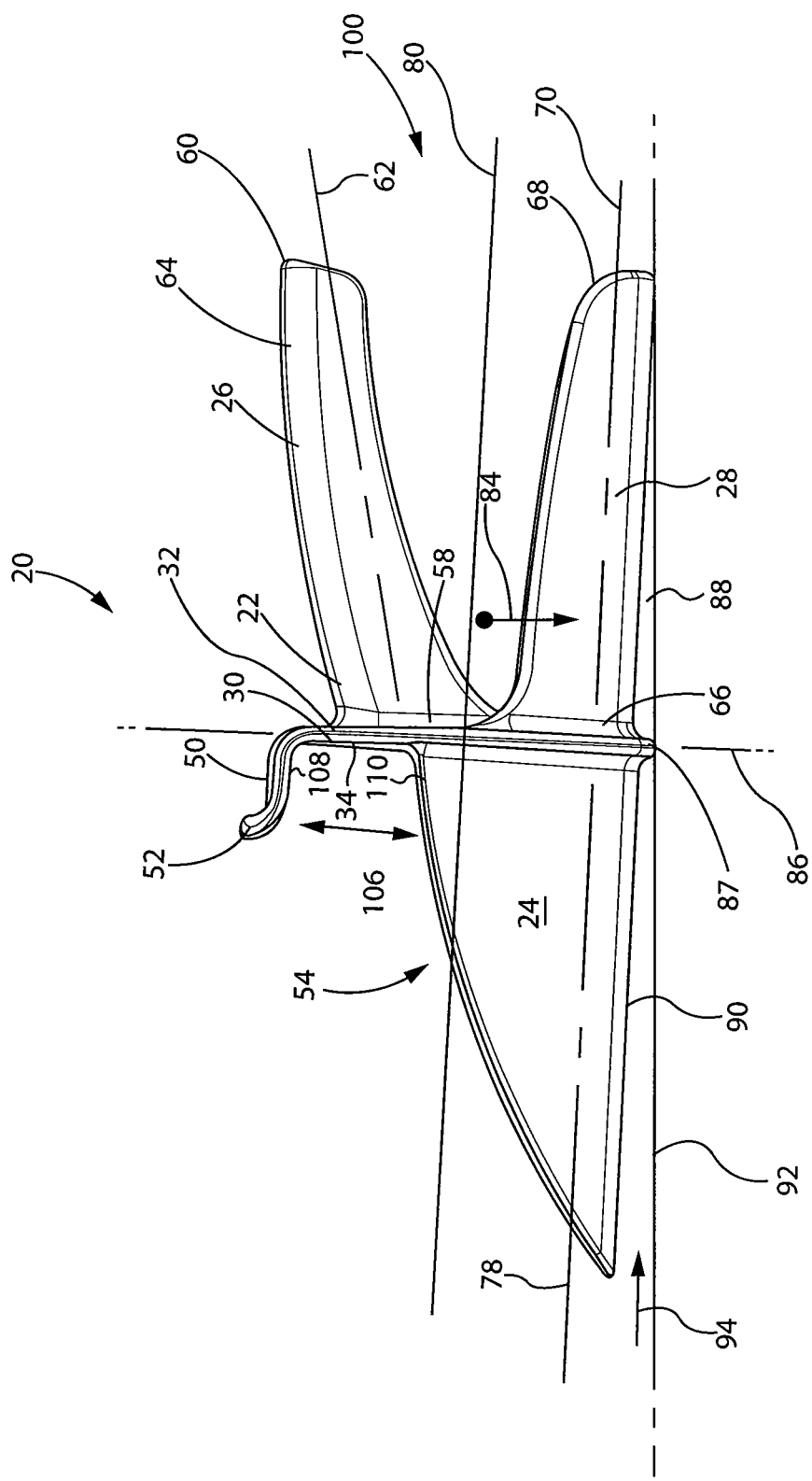
FIG. 3 is a side elevation view of the scoop shown in FIG. 1.

FIGS. 1-7 show various different views of a sanitary scoop or scoop 20 according to the present invention. Referring to FIGS. 1-3, scoop 20 is defined by a general unitary body 22 that includes a scoop portion 24, a handle portion or handle 26, and a shield portion or shield 28. A wall or partition 30 separates scoop portion 24 from handle 26 and shield 20. Said another way, handle 26 and shield 28 extend from a first side 32 of wall 30 and scoop portion 24 extends from a second side 34 of wall 30. Scoop portion 24 includes a first end 36 that is secured a second side 34 of wall 30 and a distal end 38 that is longitudinally offset from first end 36. Preferably, distal end 38 has a blunt shape to more conveniently facilitate interaction of scoop portion 24 with a scooped commodity, such as ice, in a manner that mitigates the need of user to "chase" ice around the perimeter of a bulk dispensing container as is described further below with respect to FIG. 8.

Scoop portion 24 has a generally curvilinear cross-sectional shape that is gradually reduced in a direction from first end 36 towards second end 38. Scoop portion 24 is defined by a bottom portion 40 and a pair of upstanding side portions 42, 44. As explained further below, a number of holes or openings 48 are formed in base portion 40 of scoop portion 24 of scoop 20 to facilitate drainage of commodities dispensed therewith.

A tab 50 extends from wall 30 and generally overlies scoop portion 24. Tab 50 includes a curved portion or stop 52 that is formed at a distal end thereof. Tab 50 and stop 52 are shaped to cooperate with a finger or thumb of a user of scoop 20 and to prevent inadvertent contact of the users' fingers with a commodity captured by scoop portion 24. As alluded to above, scoop portion 24 cooperates with wall 30 to define a commodity receptacle 54 associated with scooping granular or cubed goods, such as ice. Preferably, wall 30 extends above the commodity receptacle 54 defined by scoop portion 24 such that scoop 20 can be overloaded with a respective commodity as explained further below.

Referring to FIGS. 2 and 3, handle 26 includes a first end 58 that is secured to first side 32 of wall 30 and a second end 60 that is longitudinally offset, indicated by axis 62, from first end 58. Handle 26 has an outer radial surface 64 and a slightly curvilinear longitudinal shape that is selected to ergonomically cooperate with the closed hand or grasp of a user.

Handle 26 generally vertically overlies shield 28. Shield 28 includes a first end 66 that is also secured to first side 32 of wall 30 and a second end 68 that is longitudinally offset, indicated by axis 70, therefrom. Shield 28 has a generally curvilinear shape that extends about axis 70 and is defined by a base portion 72 and alternate walls 74, 76 that extend along longitudinal axis 70. The longitudinal shape of shield 28 is generally aligned with the longitudinal axis, indicated by line 78, of scoop portion 24. The longitudinal axes 62, 70, 78 of handle 26, shield 28, and scoop portion 24, respectively, are generally aligned along a longitudinal axis, indicated by line 80, of body 22 of scoop 20. It is appreciated that any of longitudinal axes 62, 70, 78 can be canted relative to axis 80, such as axis 62 of handle 26, but remain generally longitudinally aligned therewith to facilitate a convenient ergonomic interaction with the hand and wrist of the user during usage of scoop 20. Body 22 preferably has an overall longitudinal length of approximately 8 inches or about 7.533 inches or 191.33 mm.

Still referring to FIG. 3, a center of gravity, indicated by arrow 84, of scoop 20 is offset toward handle 26 and shield 28 relative to an axis, indicated by line 86, of wall 30. It should be appreciated that wall 30 extends in a crossing direction relative to the longitudinal lengths of scoop portion 24, handle 26, and shield 28. Wall 30 protrudes radially beyond, or includes a rib 87 that protrudes beyond, a bottom surface 88 of shield 28 and a bottom surface 90 of scoop portion 24. As explained further below, the rearward orientation of center of gravity 84 relative to rib 87 and/or wall 30 allows scoop 20 to maintain a slightly pitched orientation when set in a generally flat orientation, as shown in FIG. 3, upon a horizontal support surface 92, such as a table or counter. It is appreciated that center of gravity 84 can be provided rearward of wall 30 in scoop constructions with and without shield 28. It is appreciated that scoop 20 can be constructed with or without shield 28 such that center of gravity 84 is located rearward of wall 30 via constructions such as counterweighting of handle 26, constructing handle 26 of a denser material than scoop portion 24, or other suitable means. The pitched orientation of scoop 20 when the scoop is placed in a horizontal orientation as shown in FIG. 3 maintains a gap, indicated by arrow 94, between support surface 92 and bottom surface 90 of scoop portion 24 and/or handle 26. As explained further below, such an orientation is but one resting or non-use position of scoop 20 that maintains isolation of scoop portion 24 from adjacent structures to maintain a sanitary condition of scoop portion 24.

Figure 4:
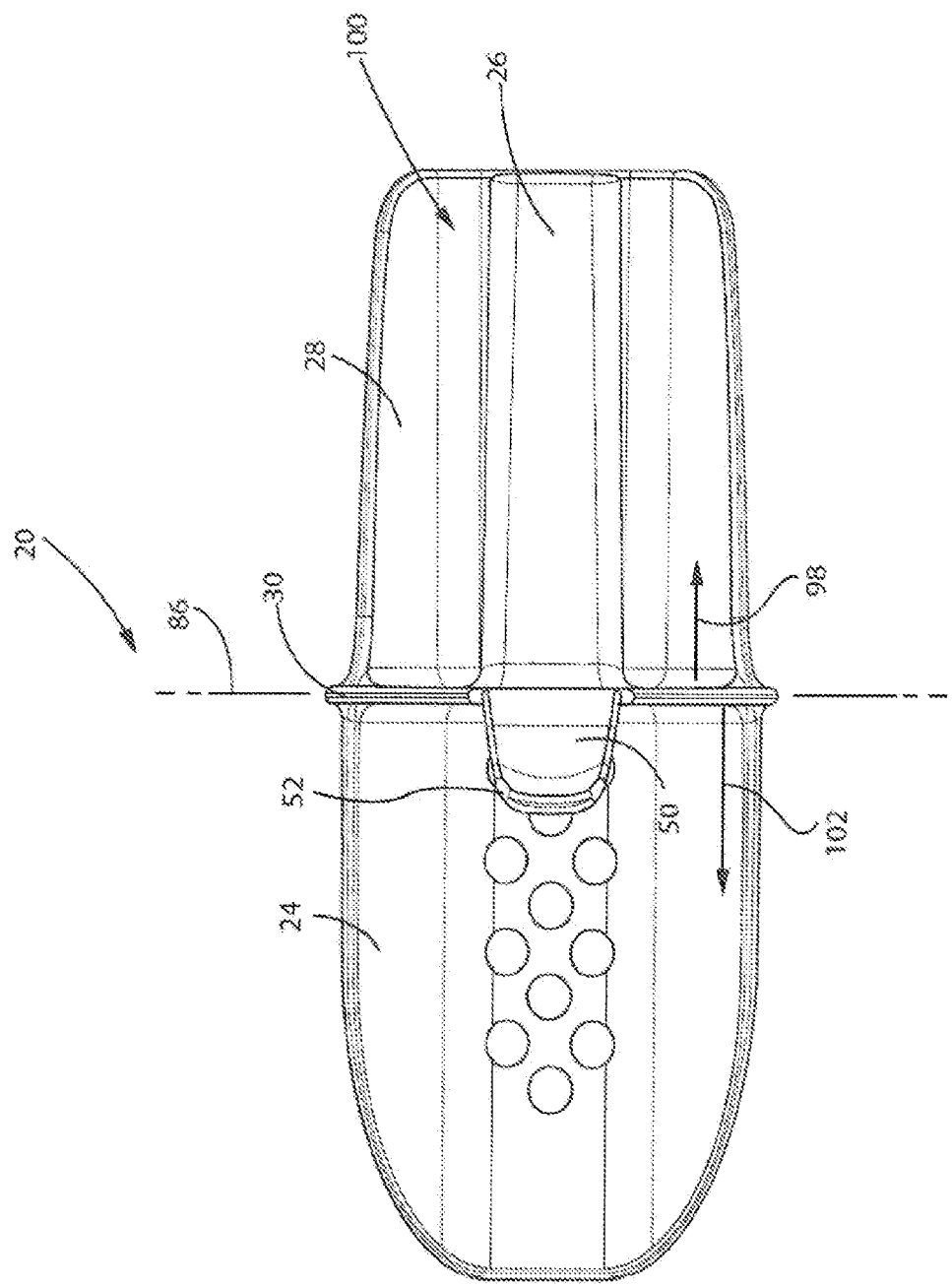
FIG. 4 is a top plan view of the scoop shown in FIG. 1.

Referring to FIGS. 3 and 4, handle 26 and shield 28 extend in a first direction 98 from wall 30 such that handle 26 generally overlies shield 28 and defines a grip, grasp, or finger window 100 between handle 26 and shield 28. Scoop portion 24 and tab 50 extend in a second direction, indicated by arrow 102, from wall 30 such that tab 50 overlies scoop portion 24 and is shaped to cooperate with the finger or a thumb of a user whose hand is engaged with handle 26. Stop 52 cooperates with the distal end of the user's finger or thumb to provide robust gripping interaction with scoop 20. Tab 50 is radially offset from scoop portion 24 and the longitudinal axis 62 associated with handle 26 to define a gap, indicated by arrow 106 (FIG. 3), between an underside 108 of tab 50 and a perimeter edge 110 of scoop portion 24. As explained further below with respect to FIG. 8, gap 106 is shaped to facilitate hanging of scoop 20 about a perimeter edge of a bulk commodity container such as an ice tote, bucket, or bin in a manner that limits contact of scoop portion 24 with non-commodity surfaces and materials. Preferably, gap 106 is shaped to allow for hanging of scoop 20 on containers having a variety of different edge shapes, thicknesses, and contours. Preferably, gap 106 is approximately 1 inch or about 0.965 inch or 24.51 mm to facilitate cooperation of the tab with the bulk containers most commonly used.

Figure 5:
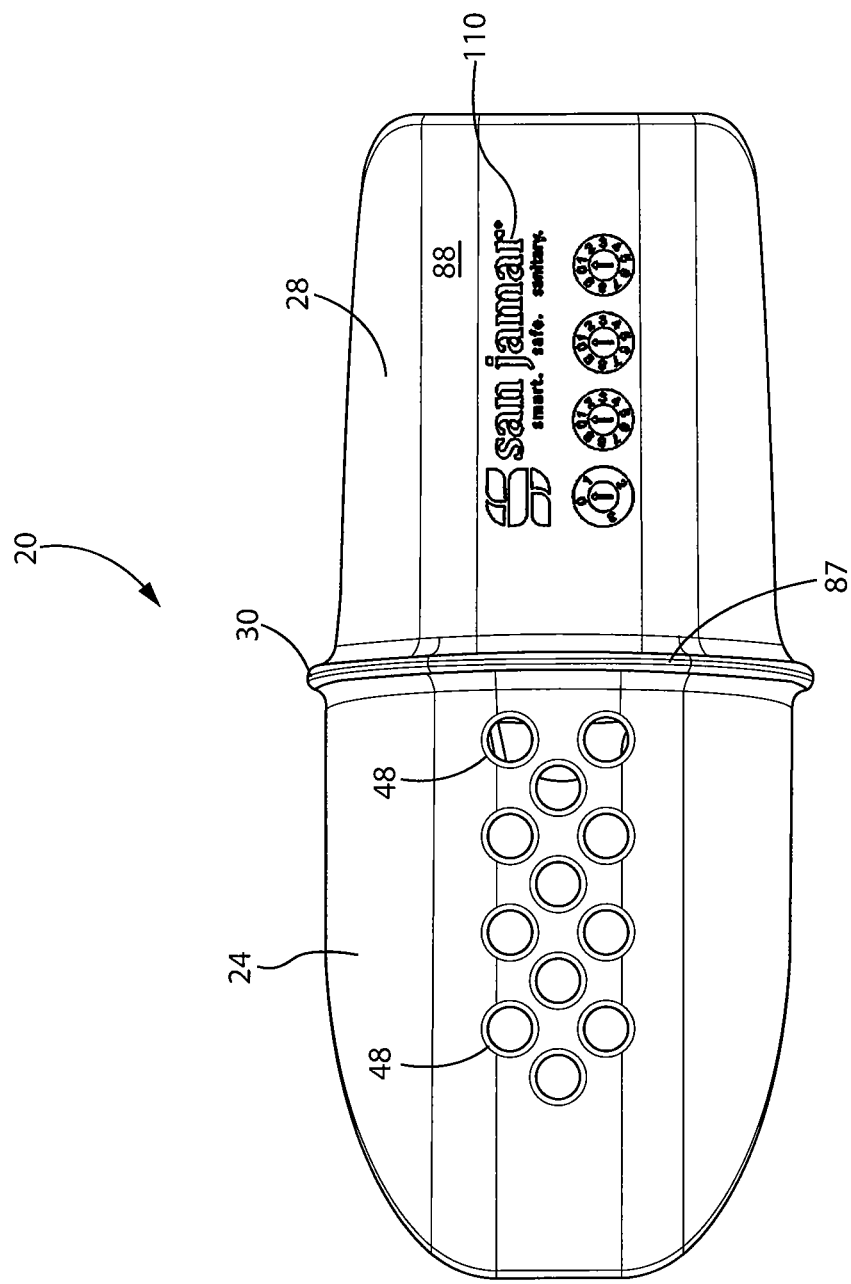
FIG. 5 is a bottom plan view of the scoop shown in FIG. 1.

Referring to FIG. 5, holes or openings 48 preferably include one or more openings in scoop portion 24 that are positioned proximate the intersection of scoop portion 24 with wall 30. When scoop 20 is used for dispensing commodities such as ice, that may be intermixed with a portion of liquid water, holes 48 facilitate the drainage of liquid water from the ice prior to dispensing of the ice. The rearward orientation of one or more of openings 48 improves efficient drainage of the liquid when the scoop is tipped rearward toward the handle during conveyance of the commodity to a separate container such as a glass or cup. That is, the orientation of holes 48 proximate wall 30 ensures efficient and near complete drainage of liquid water from the solid ice during each dispensing activity. The extension of wall 30 beyond side portions 42, 44 of scoop portion 24 retains ice that is disposed there above to allow overloading of commodity receptacle 54 when the forward edge of scoop portion 24 is inclined relative to handle 26 and also biases the liquid toward wall 30 and holes 48 positioned proximate thereto.

Bottom surface 88 of shield 28 is shaped to overly the fingers of a user's hand engaged with handle 26 and prevents contact of the users hand with material that remains in the bulk dispensing container during each dispensing activity. Surface 88 can also facilitate the display of signage 110 or other advertising materials and/or a description of scoop 20 thereon. For instance, it is envisioned that scoop 20 can be shaped to accommodate dispensing of pre-selected quantities of commodity such as a desired amount for 4-6, 8-12, or 10-16 ounce glasses or cups or larger, such as 20-24 ounce, intermediary containers with each dispensing activity. That is, it is envisioned that scoop 20 can be provided in different sizes to accommodate different volumes of scooped material per scooping activity. For individual consumption dispensing event, scoop 20 is constructed to ensure both repeatability and efficiency during beverage service activities such as during banquet events or the like.

It is also envisioned that one of more of the surface of scoop 20 be shaped to accommodate of display of signage associated with the source and/or volume metrics associated with the use of the respective scoop 20. For instance, bottom surface 88 of shield 28 can include a flat surface suitable for the display of such signage 110 and which also limits undesirable rolling of scoop 20 when placed in a horizontally flat orientation further ensuring a sanitary condition of scoop portion 24.

Figure 6:
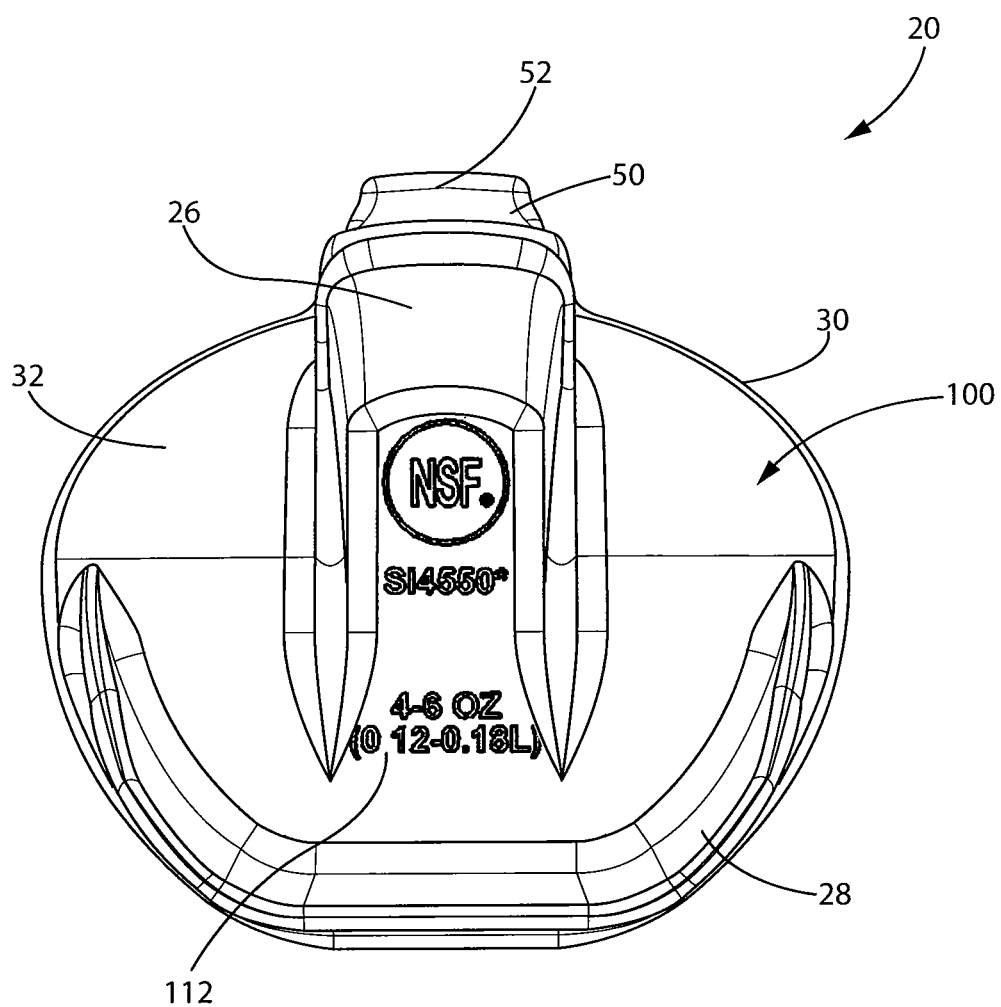
FIG. 6 is a rear elevation view of the scoop shown in FIG. 1.

Referring to FIG. 6, rear facing side 32 of wall 30 can also include one or more indicia 112 associated with the description of scoop 20 and/or the intended use thereof. In a preferred embodiment, signage 112 includes an indication of the volume of material associated with scoop portion 24 and/or the size of the secondary container such as the glass or the cup associated with receiving the contents of scoop portion 24 with each scooping event. Such an indication allows the user to readily inspect and confirm that the respective scoop 20 will achieve a desired ratio of the scooped material relative to the underlying volume of the supplemental container. As shown in FIG. 6, shield 28 defines it generally curvilinear but planar shape that is shaped to surround the fingers of the user engaged with handle 26, does so in a manner that prevents the user's fingers from contact with the scooped material during scooping activities, and prevents undesired rolling of scoop 20 if placed on a generally flat surface.

Figure 7:
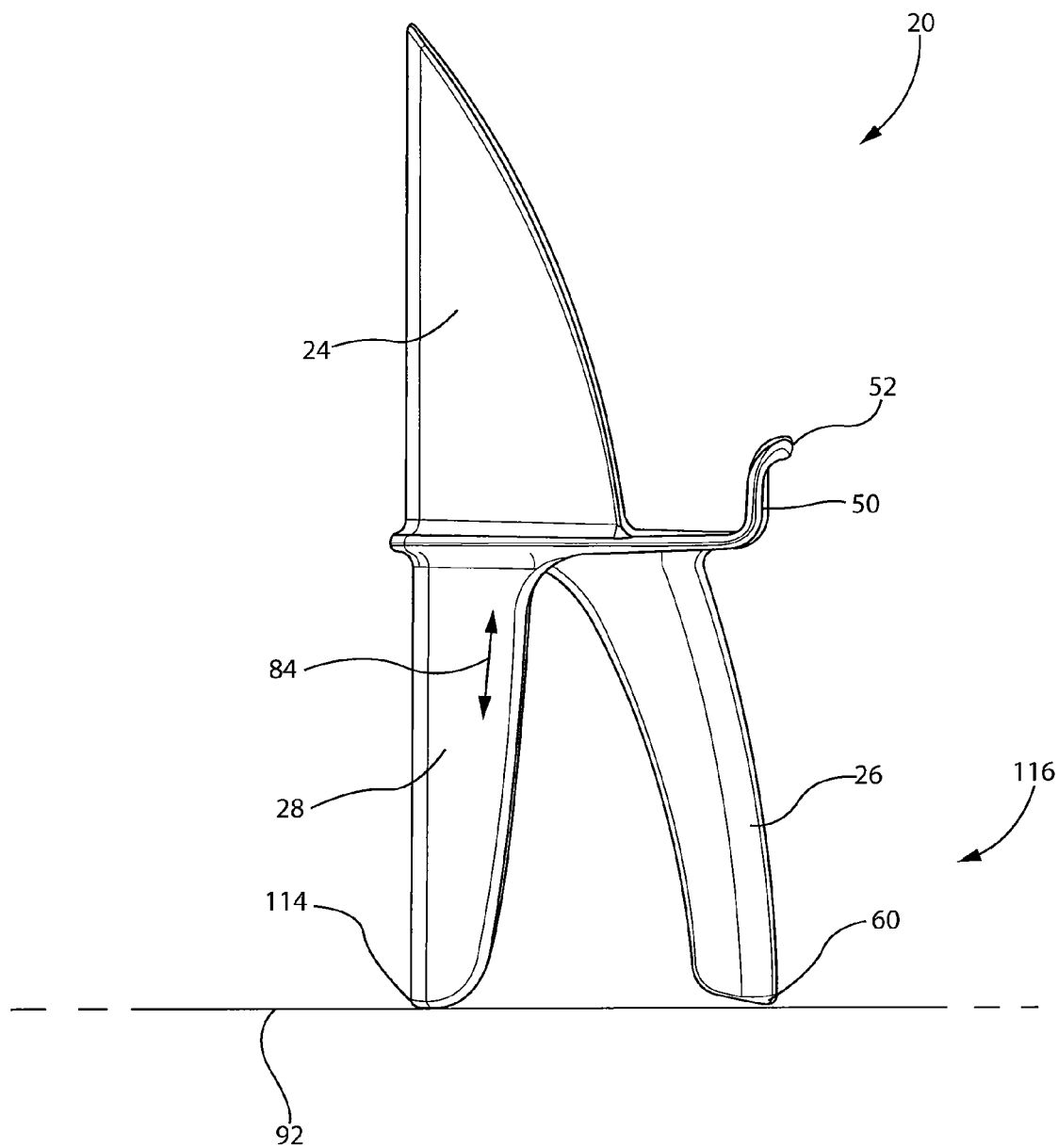
FIG. 7 is a side view of the scoop shown in FIG. 1 positioned in a standing orientation.

FIG. 7 shows another generally vertical but also sanitary orientation of scoop 20 relative to surface 92 as compared to a hanging orientation associated with the use of tab 50. As shown in FIG. 7, center of gravity 84 is located between end 60 of handle 26 and a distal end 114 of shield 28 such that scoop 20 can be stood on a handle end 116 and self supported thereby. The orientation shown in FIG. 7 maintains scoop portion 24 in a generally vertical orientation that prevents contact between scoop portion 24 and support surface 92 thereby maintaining the sanitary condition of scoop portion 24 via the avoidance of any contact or proximity to support surface 92.

Figure 8:
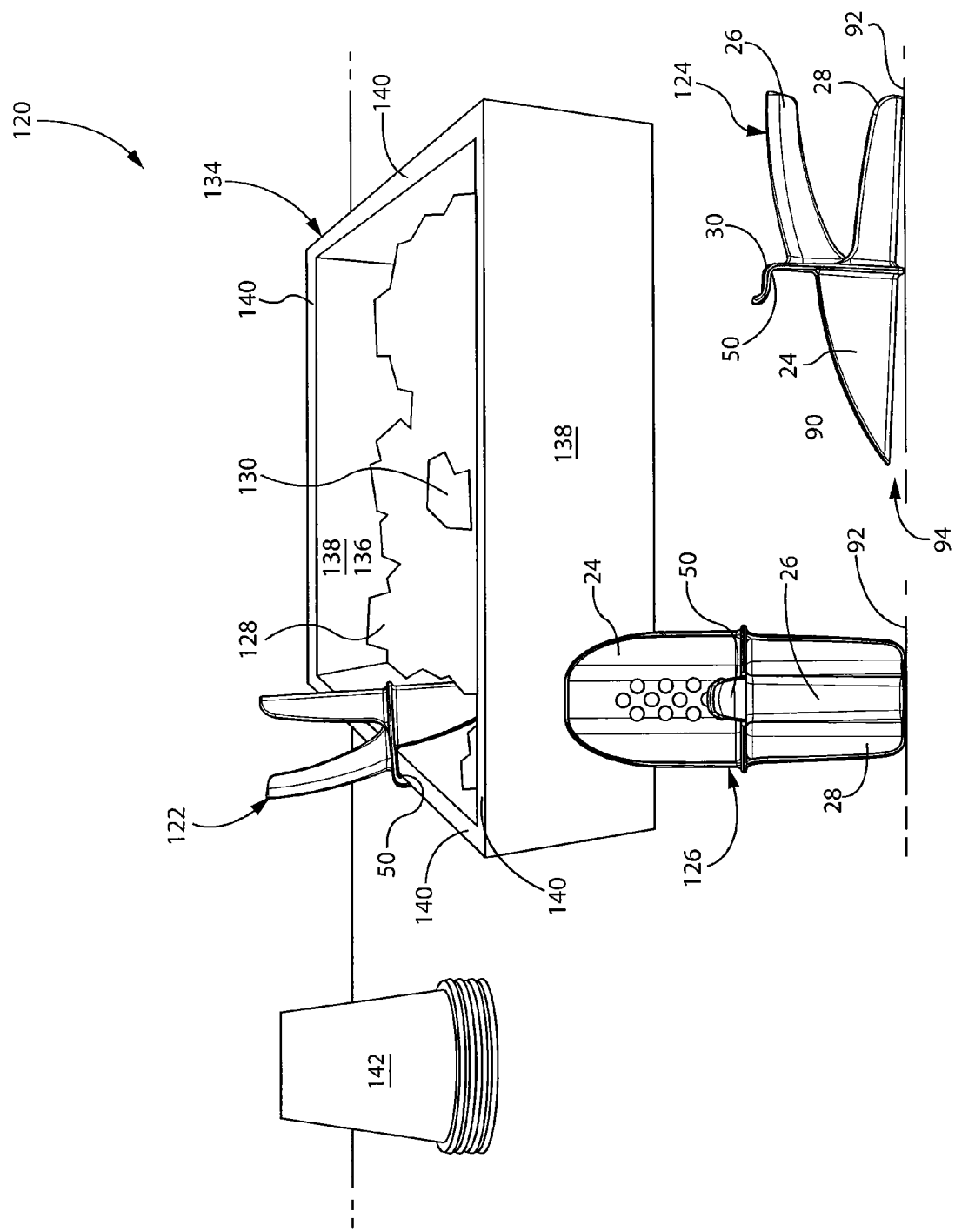
FIG. 8 is a top perspective view of an environment associated with use of one or more of the scoops shown in FIG. 1.

FIG. 8 shows an exemplary environment 120 associated with use of a plurality 122, 124, 126 of scoops 20. Understandably, environment 120 may include one or more scoops 20 but the plurality of scoops 122, 124, 126 are shown to facilitate a clear understanding of the multiple positions that scoop 20 can achieve and maintain a sanitary condition of scoop portion 24 relative to the commodity being dispensed, such as ice 128, and corresponding support surfaces 92 such as a counter or table.

Scoops 122, 124, 126 may or may not be subject to use with a somewhat melted ice bath that contains some liquid water 130 depending on setting conditions such as how long the ice has been exposed to atmosphere and the ambient conditions associated with environment 120. Environment 120 includes a bulk reciprocal such as an ice bucket or bin 134 that is defined by a cavity 136 and one or more upstanding walls 138 that terminate at an edge or a lip 140 associated with bin 134. Ice 128 contained in bin 134 can be distributed to one or more supplemental container such as glasses or cups 142 during multiple discrete dispensing events but can be maintained in various orientations that maintain a sanitary condition of the respective scoop portion 24 associated with any of scoops 122, 124, 126. It is appreciated that environment 120 may be provided with alternate sized scoops for dispensing metered amounts of ice to different sized containers associated with a particular guest or customer.

Hanging scoop 122 is disposed proximate wall 138 of bin 34 such that lip 140 of bin 134 is captured between tab 50 and scoop portion 24 of hanging scoop 122. Although hanging scoop 122 is shown such that scoop portion 124 is disposed within the perimeter of walls 138, is appreciated that the orientation of hanging scoop 122 may be reversed such that scoop portion 124 is positioned outside walls 138 but still extends in a generally vertically oriented downward direction relative to wall 138 and such that tab 50 points in a radially inward oriented orientation relative to walls 138 of bin 134. Each orientation limits contact of scoop portion 24 of scoop 122 with surfaces other than the ice contained in bin 134.

Horizontally set scoop 124 is set upon support surface 92 proximate bin 134 and maintains an orientation wherein the gap 94 associated with scoop portion 24 is formed between surface 92 of scoop portion 24 and support surface 92. Alternatively, when not oriented in the hanging orientation associated with scoop 122 or the horizontally set orientation associated with scoop 124, a respective scoop 20 can be positioned in a vertically oriented or positioned as a vertically standing scoop 126 as shown in FIG. 7 in usable proximity to bin 134. Each of the orientations associated with scoops 122, 124, and 126 facilitate convenient usage of scoop and in a manner that maintains isolation of the scoop portion 24 relative to surface 92, adjacent structures, and the user's hands but is conveniently accessible by the prospective users thereof. As such, scoop 20 is provided in the configuration that maintains sanitation of the scoop portion 24 but is supportable in various positions relative to a dispensing environment 120 in manners that maintain the sanitation of the scoop portion 24.

As disclosed above, it is appreciated that scoop 20 according to the present invention may be implemented in a variety of configurations, using certain features or aspects of the several embodiments described herein and others known in the art. Thus, although the invention has been herein shown and described in what is perceived to be the most practical and preferred embodiments, it is to be understood that the invention is not intended to be limited to the specific features and embodiments set forth above. Rather, it is recognized that modifications may be made by one of skill in the art of the invention without departing from the spirit or intent of the invention and, therefore, the invention is to be taken as including all reasonable equivalents to the subject matter disclosed herein.

What we claim is:

1. A scoop apparatus comprising:
    a body that extends along a longitudinal axis;

a wall formed by the body and that extends in a crossing direction relative to the longitudinal axis;

a handle portion defined by the body that extends in a first direction away from the wall along the longitudinal axis, the handle portion being shaped to facilitate gripping of the handle by a hand of a user;

a scoop portion that extends in a second direction opposite the first direction along the longitudinal axis away from the wall;

a center of gravity of the body being offset from the wall along the longitudinal axis toward the handle portion to maintain a gap between the scoop portion and a horizontal surface;

and further comprising a tab that extends from the wall in the second direction, the tab extending from the wall at a location that is radially opposite the scoop portion.

2. The scoop apparatus of claim 1 further comprising at least one drainage hole formed in the scoop portion.

3. The scoop apparatus of claim 1 further comprising a stop that extends from an end of the tab in an outward radial direction away from the scoop portion.

4. The scoop apparatus of claim 1 further comprising a shield portion that extends in the first direction away from the wall and is spaced from the handle portion to define a finger passage that is formed therebetween.

5. The scoop apparatus of claim 4 wherein the wall extends radially beyond intersections of the scoop portion and the shield portion with the wall.

6. A scoop apparatus comprising:
a handle portion that extends in a first direction along a longitudinal axis of the scoop apparatus;
a scoop portion that extends in a second direction opposite the first direction along the longitudinal axis;
a tab that extends in the second direction and is offset radially from the scoop portion, the tab defining a first surface that faces the scoop portion and a second surface that is opposite the first surface that is shaped to engage a thumb of a hand of a user engaged with the handle portion;
and wherein a center of gravity of the scoop apparatus overlies the handle portion to maintain a gap between an underside of the scoop portion and a generally horizontal support surface.

7. The scoop apparatus of claim 6 further comprising a wall portion that extends in a crossing direction relative the longitudinal axis of the scoop apparatus between the handle portion and the scoop portion.

8. The scoop apparatus of claim 6 wherein the wall extends in an outward radial direction relative to the longitudinal axis of the scoop portion beyond a convex side of the scoop portion.

9. The scoop apparatus of claim 6 further comprising at least one hole formed through the scoop portion.

10. The scoop apparatus of claim 9 further comprising another hole formed through the scoop portion and wherein at least one of the at least hole and the another hole are formed nearer a rearward end of the scoop portion than a forward end of the scoop portion.

11. The scoop apparatus of claim 6 wherein opposite lateral ends of the tab are spaced from opposite lateral edges of the scoop portion.

12. The scoop apparatus of claim 11 wherein a distance between the opposite lateral ends of the tab and the opposite lateral edges of the scoop portion allows the scoop to be hung in a vertical orientation from a vertical edge of an ice bucket or a banquet ice bin.

13. The scoop apparatus of claim 6 further comprising a stop formed at a distal end of the tab and that is turned in a direction away from the scoop portion.

14. The scoop apparatus of claim 6 further comprising a shield that underlies the handle portion to define a finger passage between the handle portion and the shield, the handle portion and the shield extending in the first direction such that the scoop apparatus can be supported in a vertical orientation by distal ends of the shield and handle portion being engaged with a horizontal surface.

15. A sanitary scoop comprising:
a scoop portion, a handle portion, and a shield portion that each extend along generally aligned respective longitudinal directions;
a partition that extends in a crossing direction relative to the respective longitudinal directions, the partition having a first side that faces the handle portion and the shield portion and a second side that faces the scoop portion;
a tab that extends from the second side of the partition at a location that is generally opposite the scoop portion, the tab being offset in an outward radial direction from an intersection of the handle portion with the partition; and
wherein the shield portion and the handle portion extend respective distances from the partition such that a center of gravity of the sanitary scoop lies between respective terminal ends of the handle portion and the shield portion such that the scoop can maintain a generally vertical orientation wherein the sanitary scoop is supported by interaction of the terminal ends of the handle portion and the shield portion with a horizontal surface.

16. The sanitary scoop of claim 15 further comprising a rib that extends in an outward radial direction and is proximate the partition so that the center of gravity of the sanitary scoop does not overly the scoop portion.

17. The sanitary scoop of claim 15 wherein the tab further comprises a stop formed at a distal end thereof and wherein the stop turns in an outward radial direction away from the scoop portion.

18. The sanitary scoop of claim 15 further comprising a knuckle window formed between the handle portion and the shield portion that is shaped to allow user fingers to wrap around the handle portion.

19. The sanitary scoop of claim 15 further comprising at least one drain formed through the scoop portion.

20. A scoop apparatus comprising:
a handle portion that extends in a first direction along a longitudinal axis of the scoop apparatus;
a scoop portion that extends in a second direction opposite the first direction along the longitudinal axis;
a tab that extends in the second direction and is offset radially from the scoop portion, the tab defining a first surface that faces the scoop portion and a second surface that is opposite the first surface that is shaped to engage a thumb of a user; and
a stop formed at a distal end of the tab and that is turned in a direction away from the scoop portion.

21. A scoop apparatus comprising: a handle portion that extends in a first direction along a longitudinal axis of the scoop apparatus; a scoop portion that extends in a second direction opposite the first direction along the longitudinal axis; a tab that extends in the second direction and is offset radially from the scoop portion, the tab defining a first surface that faces the scoop portion and a second surface that is opposite the first surface that is shaped to engage a thumb of a hand of a user engaged with the handle portion; and further comprising a wall portion that extends in a crossing direction relative the longitudinal axis of the scoop apparatus between the handle portion and the scoop portion.

22. A scoop apparatus comprising: a handle portion that extends in a first direction along a longitudinal axis of the scoop apparatus; a scoop portion that extends in a second direction opposite the first direction along the longitudinal axis; a tab that extends in the second direction and is offset radially from the scoop portion, the tab defining a first surface that faces the scoop portion and a second surface that is opposite the first surface that is shaped to engage a thumb of a hand of a user engaged with the handle portion; and further comprising a stop formed at a distal end of the tab and that is turned in a direction away from the scoop portion.

23. A scoop apparatus comprising: a handle portion that extends in a first direction along a longitudinal axis of the scoop apparatus; a scoop portion that extends in a second direction opposite the first direction along the longitudinal axis; a tab that extends in the second direction and is offset radially from the scoop portion, the tab defining a first surface that faces the scoop portion and a second surface that is opposite the first surface that is shaped to engage a thumb of a hand of a user engaged with the handle portion; and further comprising a shield that underlies the handle portion to define a finger passage between the handle portion and the shield, the handle portion and the shield extending in the first direction such that the scoop apparatus can be supported in a vertical orientation by distal ends of the shield and handle portion being engaged with a horizontal surface.

* * * * *